US008454883B2

(12) United States Patent
Chen et al.

(10) Patent No.: US 8,454,883 B2
(45) Date of Patent: Jun. 4, 2013

(54) NANOCOMPOSITE MATERIAL APPARATUS, NANOCOMPOSITE MATERIAL AND METHOD FOR FABRICATING THEREOF, NANO MATERIAL APPARATUS AND NANO MATERIAL

(75) Inventors: Chuh-Yung Chen, Tainan (TW); Cheng-Chien Wang, Tainan County (TW); I-Han Chen, Tainan (TW); Chia-Chun Liao, Tainan (TW); Szu-Wen Chen, Tainan County (TW); Chun-Liang Lee, Taipei County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 757 days.

(21) Appl. No.: 12/622,436

(22) Filed: Nov. 20, 2009

(65) Prior Publication Data
US 2010/0173157 A1 Jul. 8, 2010

(30) Foreign Application Priority Data

Jan. 5, 2009 (TW) ................................. 98100026 A
Jul. 22, 2009 (TW) ................................. 98124739 A

(51) Int. Cl.
*B29C 39/14* (2006.01)
(52) U.S. Cl.
USPC ... 264/484; 264/503; 264/171.29; 264/209.2; 264/8; 264/310; 264/311; 264/312; 425/382.3; 425/381.2; 425/382 R; 425/382.2; 425/382 N; 425/418; 425/433; 425/435
(58) Field of Classification Search
USPC ............ 425/382.3, 381.2, 382 R, 382.2, 425/382 N, 418, 433, 435; 264/503, 171.29, 264/209.2, 8, 310, 311, 312, 484
See application file for complete search history.

(56) References Cited

U.S. PATENT DOCUMENTS

| 3,542,533 | A * | 11/1970 | Hesse | 264/8 |
| 4,323,524 | A * | 4/1982 | Snowden | 264/8 |
| 6,116,880 | A * | 9/2000 | Bogue et al. | 425/8 |
| 2006/0228435 | A1* | 10/2006 | Andrady et al. | 425/174.8 R |
| 2008/0237934 | A1* | 10/2008 | Reneker et al. | 264/464 |
| 2008/0242171 | A1* | 10/2008 | Huang et al. | 264/172.13 |
| 2009/0232920 | A1* | 9/2009 | Lozano et al. | 425/72.2 |

* cited by examiner

*Primary Examiner* — Timothy Kennedy
(74) *Attorney, Agent, or Firm* — Jianq Chyun IP Office

(57) ABSTRACT

A nanocomposite material apparatus suitable for fabricating a nanocomposite material from different materials is provided. The nanocomposite material apparatus includes an acceleration inner tube and a collection outer tube. The acceleration inner tube disposed along a rotation axis has a top surface, a bottom surface and an outer peripheral surface. Pipes for accelerating different materials is distributed within the acceleration inner tube. Each pipe includes an inlet, an outlet opening at the outer peripheral surface and a spiral trench connecting the inlet and the outlet. Nano materials having electricity are emitted from the corresponding outlets by accelerating different materials within the corresponding pipes. The collection outer tube disposed surroundingly on the acceleration inner tube is suitable for moving oppositely thereto, so that the nano-materials emitted from the outer peripheral surface are combined with one another and form a nanocomposite material on the inner wall of the collection outer tube.

29 Claims, 13 Drawing Sheets

NANOCOMPOSITE MATERIAL APPARATUS, NANOCOMPOSITE MATERIAL AND METHOD FOR FABRICATING THEREOF, NANO MATERIAL APPARATUS AND NANO MATERIAL

CROSS-REFERENCE TO RELATED APPLICATION

This application claims the priority benefits of Taiwan patent application serial no. 98100026, filed on Jan. 5, 2009, and application serial no. 98124739, filed on Jul. 22, 2009. The entirety of each of the above-mentioned patent applications is hereby incorporated by reference herein and made a part of specification.

BACKGROUND OF THE INVENTION

1. Field of the Invention

The invention relates to a nano material apparatus and a method of fabricating a nano material, and more particularly to a nanocomposite material apparatus and a method of fabricating a nanocomposite material.

2. Description of Related Art

Recently, the technique configured for processing nanomaterials having a nanometer-size is generally referred as nanotechnology in various industries, and nanotechnology has gained enormous attention in the application fields of various industries.

As compared with a bulk material, physical, mechanical, and chemical properties of a material are changed greatly when the size thereof is reduced into the nano-scaling. Therefore, in addition to changing the composition of the material to obtain required properties of different materials, basic characteristics such as the melting point, color, optical, electrical, and magnetic properties of the same material may also be further controlled by controlling the size and shape of this material. Based on this feature, high-performance products or techniques that cannot be achieved in the past may be realized in the field of nano science and technology.

Generally, nano materials have a variety of types, including metallic nano materials, semiconductor nano materials, nanostructured ceramics, and nano-polymer materials, and may have a zero-dimensional structure, one-dimensional structure, or two-dimensional structure. In order to enhance basic properties of nano materials for applying in various fields, manufacturers compound nano materials with multiple materials in the nanometer level to develop a new material with superior function. However, in the technique of compounding nano materials, how to make materials of different species attain evenly distributed nanometer level for maintaining original properties and strength of every nano material in nanocomposite material and how to mass produce nanocomposite materials with aforementioned superior properties efficiently in the existing processes are major challenges in the current manufacturing process.

SUMMARY OF THE INVENTION

The invention is directed to a nanocomposite material and a nanocomposite material apparatus, and is capable of forming a nanocomposite material in a simple manner to take both material properties and mass productivity into consideration.

The invention is directed to a nanocomposite material and a method of fabricating a nanocomposite material, and is capable of providing a nanocomposite material having superior properties in a simple manner.

The invention is directed to a nanocomposite material and a nanocomposite material apparatus, suitable for fabricating a nanocomposite material from different materials, and the nanocomposite material and the nanocomposite material apparatus include an acceleration inner tube and a collection outer tube. The acceleration inner tube is disposed along a rotation axis. The acceleration inner tube has a top surface, a bottom surface, and an outer peripheral surface. Moreover, a plurality of pipes for accelerating different materials is distributed within the acceleration inner tube. Each pipe includes an inlet, an outlet disposed on the outer peripheral surface, and a spiral trench connecting the inlet and the outlet. A plurality of charged nano materials are emitted from the corresponding outlets by accelerating different materials within the corresponding pipes. The collection outer tube is disposed circularly on the outer peripheral surface of the acceleration inner tube and is suitable for moving oppositely to the acceleration inner tube along the rotation axis. Therefore, the nano materials emitted from the outer peripheral surface combine with one another and form a nanocomposite material on an inner wall of the collection outer tube.

According to an embodiment of the invention, the spiral trench extends from the top surface to the bottom surface along a spiral curve, for example.

According to an embodiment of the invention, a cross-sectional area of the spiral trench increases with an increase in a distance away from the top surface.

According to an embodiment of the invention, the nanocomposite material apparatus further includes a linear sliding guide connecting to the collection outer tube. The linear sliding guide is disposed in parallel to the rotation axis. The collection outer tube moves back and forth oppositely to the acceleration outer tube through the linear sliding guide.

According to an embodiment of the invention, the nanocomposite material apparatus further includes two electrode sheets circularly disposed on an upper edge and a lower edge of an outer wall of the collection outer tube respectively, for instance, and an electrostatic field is generated between the acceleration inner tube and the collection outer tube.

According to an embodiment of the invention, the nanocomposite material apparatus further includes a spiral coil and a grounding rod. The spiral coil surrounds the outer wall of the collection outer tube and has a joint respectively in different sections of the spiral coil. The grounding rod respectively connects to the joints movably.

According to an embodiment of the invention, the outlet includes a first outlet and a second outlet. A first nano material made from a first material is emitted via the first outlet and a second nano material made from a second material is emitted via the second outlet. The first outlet aligns with the second outlet, and the first outlet and the second outlet are arranged as concentric circles.

According to an embodiment of the invention, the nanocomposite material apparatus further includes a voltage generator connecting to the acceleration inner tube, and the materials are charged through the voltage generator.

According to an embodiment of the invention, the nanocomposite material apparatus further includes an outer container. The outer container has an accommodating space and a movable outer lid. The acceleration inner tube and the collection outer tube are stored within the accommodating space. In addition, the accommodating space forms a closed space by closing the movable lid.

The invention is further directed to a nanocomposite material, which is fabricated by the nanocomposite material apparatus aforementioned.

According to an embodiment of the invention, the nanocomposite material is a solid nanofiber, a hollow nanofiber, and a nanoparticle.

The invention is further directed to a method of fabricating a nanocomposite material suitable for fabricating through the nanocomposite material apparatus aforementioned. The method of fabricating the nanocomposite material includes the following. Firstly, a first material and a second material are provided in different inlets respectively. Thereafter, the first material and the second material are accelerated respectively in the plurality of spiral trenches by a centrifugation force generated by rotating the acceleration inner tube so as to emit a plurality of charged nano materials from the plurality of outlets. Moreover, an electric field effect is utilized for the nano materials and the nanocomposite material to receive a certain degree of drawing, thereby obtaining a nanometer level nano material and nanocomposite material. The nano materials move oppositely to the collection outer tube in a direction parallel to the rotation axis, and the nano materials combine with one another and form a nanocomposite material on an inner wall of the collection outer tube.

According to an embodiment of the invention, in the method of charging the nano materials, before the first material and the second material are provided in the inlets, positive charges and negative charges are conducted into the first material and the second material through a voltage generator, for example.

According to an embodiment of the invention, in the method of moving the nano materials oppositely to the collection outer tube in the direction parallel to the rotation axis, the collection outer tube is connected with a linear sliding guide, for instance. The linear sliding guide is parallel to the rotation axis and the collection outer tube moves back and forth oppositely to the acceleration inner tube through the linear sliding guide.

According to an embodiment of the invention, in the method of moving the nano materials oppositely to the collection outer tube in the direction parallel to the rotation axis, a charged electrode sheet is disposed on an upper edge and a lower edge of an outer wall of the collection outer tube respectively, for example. Consequently, an electrostatic field is generated between the acceleration inner tube and the collection outer tube. Next, the nano materials emitted from the outlets move oppositely to the collection outer tube through the electrostatic field, for instance.

According to an embodiment of the invention, in the method of moving the nano materials oppositely to the collection outer tube in the direction parallel to the rotation axis, a charged spiral coil surrounds the outer wall of the collection outer tube, for example. Herein, the spiral coil has a joint in different sections parallel to the rotation axis and an electrostatic field is generated between the spiral coil and the acceleration inner tube. Afterwards, one of the plurality of joints of the spiral coil is contacted with a grounding rod so as to generate a greatest value in the electrostatic field at the joint. The nano materials emitted from the outlets are emitted toward a direction of the joint contacted with the grounding rod.

According to an embodiment of the invention, the first material and the second material in the inlets are provided by continuous feeding, and the nano materials and the nanocomposite material emitted from the outlets form nanofibers, so as to form a non-woven nanofiber composite material on the inner wall of the collection outer tube.

According to an embodiment of the invention, a first nano material made from the first material is emitted from the corresponding outlet and a second nano material made from the second material is emitted from the corresponding outlet, for example. At this time, the second nano material wraps the first nano material.

According to an embodiment of the invention, the first material and the second material in the inlets are provided by sectioned feeding, for example. Additionally, the second nano material emitted from the outlets encapsulates the first nano material completely to form a nanoball composite material in a particle form.

According to an embodiment of the invention, the first material is an organic material or an inorganic material.

According to an embodiment of the invention, the second material is an organic material or an inorganic material.

According to an embodiment of the invention, a melting point or glass transition temperature of the first material is smaller than a melting point or glass transition temperature of the second material, or the melting point or glass transition temperature of the first material is greater than the melting point or glass transition temperature of the second material, for example.

According to an embodiment of the invention, in providing the first material and the second material in different inlets, a third material is provided simultaneously. Furthermore, the nanocomposite material is constituted by alternative arrangement when the first material, the second material, and the third material are emitted from the corresponding outlets.

The invention is further directed to a nano material apparatus, suitable for fabricating a material into a nano material, and the nano material apparatus includes an acceleration inner tube body and an acceleration inner tube lid. The acceleration inner tube body is disposed along a rotation axis and has a core portion and an outer peripheral surface. A plurality of pipes for accelerating the material distributed within the acceleration inner tube body. Here, the pipes include an inlet located at the core portion, a plurality of outlets disposed on the outer peripheral surface, and a plurality of trenches connecting the inlet and the outlets. The trenches are located on the same plane of the acceleration inner tube body and exposed, and the material is a nano material accelerated by the pipes and emitted from the outlets. The acceleration inner tube lid covers the trenches exposed and is installed detachably on the acceleration inner tube body.

According to an embodiment of the invention, the trenches are substantially located on a top surface of the acceleration inner tube body and radiate from the core portion toward the outer peripheral surface in a radiation form, for instance.

According to an embodiment of the invention, each trench extends along the same plane of the acceleration inner tube body from the core portion to the outer peripheral surface along a spiral curve.

According to an embodiment of the invention, the acceleration inner tube lid covers a side of the plurality of trenches having a flat surface, for example.

According to an embodiment of the invention, the material is reactive and the material is accelerated and reacted at the same time in the trenches, for example, to obtain a functionalized nano material from the outlets.

According to an embodiment of the invention, the nano material apparatus further includes a plurality of conductive nozzles. Each conductive nozzle is disposed on each outlet and charged. The charged nano material made from the nano material is emitted from the outlets through the conductive nozzles. According to an embodiment of the invention, the nano material apparatus further includes a rotation axle, a conductive ring, and a plurality of conductive sheets. Herein, a center line of the rotation axle aligns with a rotation axis. The acceleration inner tube body is fixed to the rotation axle and the conductive ring is circularly disposed on the rotation axle. Each conductive sheet is located between each outlet and the corresponding nozzle. Moreover, the conductive sheets transmit charges to the conductive nozzles through the conductive ring.

According to an embodiment of the invention, the nano material apparatus further includes a collection outer tube, circularly disposed on the outer peripheral surface of the acceleration inner tube body and suitable for moving oppositely to the acceleration inner tube along the rotation axis. Therefore, the nano materials emitted from the outer peripheral surface combine with one another and form a nano material on an inner wall of the collection outer tube. In addition, the collection outer tube can be charged so as to generate an electrostatic field between the acceleration inner tube body and the collection outer tube. Further, the inner wall of the collection outer tube has a predetermined pattern, so that the nano material formed on the collection outer tube has a pattern identical to the predetermined pattern.

The invention is further directed to a nano material, which is fabricated by the nano material apparatus aforementioned.

According to an embodiment of the invention, the nano material is a functionalized nano material, for instance.

In light of the foregoing, the nanocomposite material apparatus and the method of fabricating the nanocomposite material utilize the centrifugation force of the acceleration inner tube and the electric field effect for the nano material and the nanocomposite material to obtain a certain degree of drawing, thereby reducing different materials into the nanometer level nano material. Furthermore, by suitably disposing the spiral trench in the acceleration inner tube, different nano materials are evenly distributed after emitting from the acceleration inner tube. Moreover, by incorporating a suitable structure to the collection outer tube, when the nano materials combine with one another to form a nanocomposite material on the collection outer tube, the collection outer tube not only can be formed with the radial movement, but can also be facilitated by the axial movement. Hence, in the composition of the nanocomposite material formed by the nanocomposite material apparatus of the invention, the degree of different nanomaterials interlacing one another is high, thereby producing superior properties. In some embodiments, by changing the speed control of supplies, the bias, the solution polarity, the viscosity of reacting solution and the like, the nanocomposite ball is optionally formed to be applied in the display field. Moreover, since the acceleration inner tube body in the nano material apparatus has the trenches located on the same plane and being exposed in some embodiments, and the acceleration inner tube lid is detachably covered on the trenches, the nano material apparatus of the invention is also easy to maintain. Therefore, the maintenance schedule is shortened and the product yield rate of the nano material is maintained.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

The first embodiment of the invention is mainly directed to a new and simple direct formation method. This formation method utilizes a centrifugation force of an acceleration inner tube and an electric field effect for a nano material and a nanocomposite material to obtain a certain degree of drawing so as to fabricate a nano material structure from different materials and evenly mix different nano materials when forming thereof, thereby forming a nanocomposite material with high distribution and superior structural strength.

Figure 1:
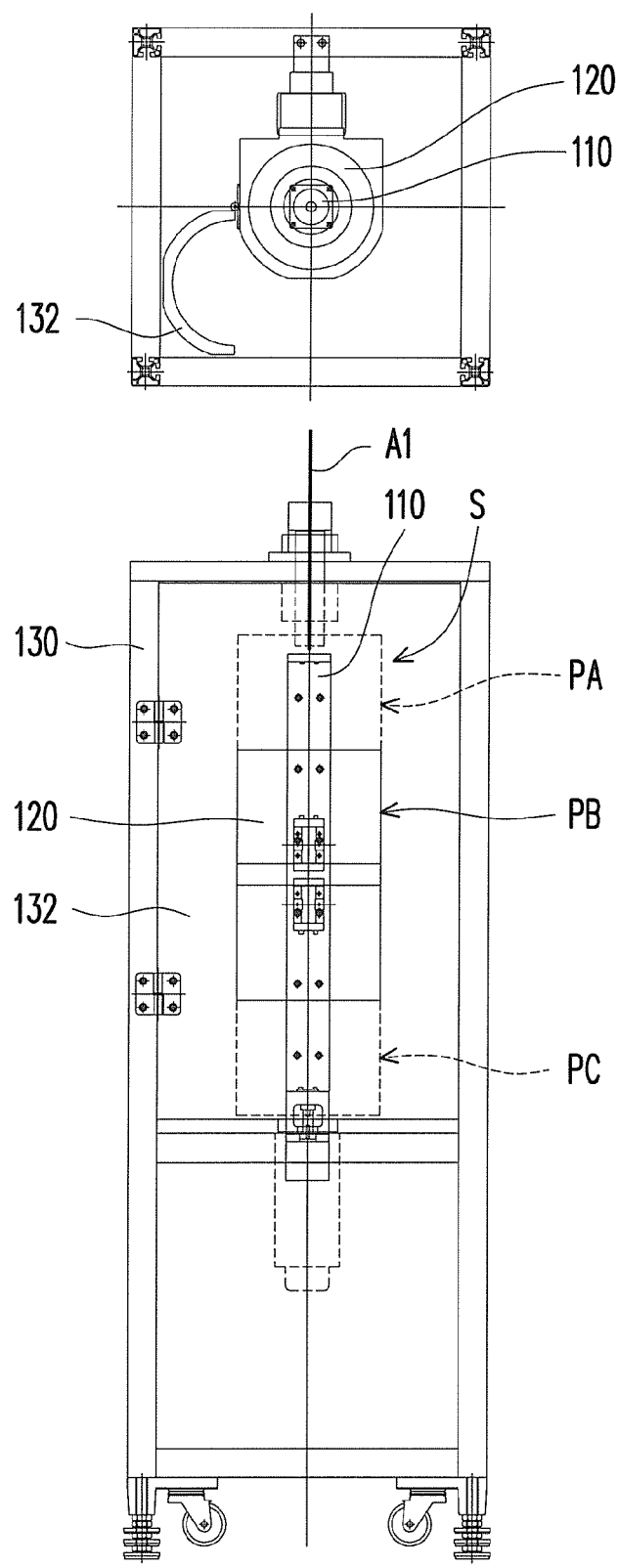
FIG. 1 shows a top view and a side view of a nanocomposite material apparatus according to a first embodiment of the invention.

FIG. 1 shows a top view and a side view of a nanocomposite material apparatus according to the first embodiment of the invention. Referring to FIG. 1, a nanocomposite material apparatus 100 is suitable for fabricating a nanocomposite material from different materials. Moreover, the nanocomposite material apparatus 100 is mainly constituted by an acceleration inner tube 110 and a collection outer tube 120. In the present embodiment, the acceleration inner tube 110 and the collection outer tube 120 are, for example, stored in an outer container 130 having an accommodating space S. The outer container 130 has a movable lid 132 located on a side surface for isolating the acceleration inner tube 110 and the collection outer tube 120 from the external environment by closing the movable lid 132 during a fabrication of the nanocomposite material, thereby further enhancing product quality. Obviously, in some special processing demands, nitrogen or other gases can be filled into the closed accommodating space S as a circulating gas or a reacting gas. Additionally, a fabricating environment of the acceleration inner tube 110 and the collection outer tube 120 is not limited in the invention.

Figure 2:
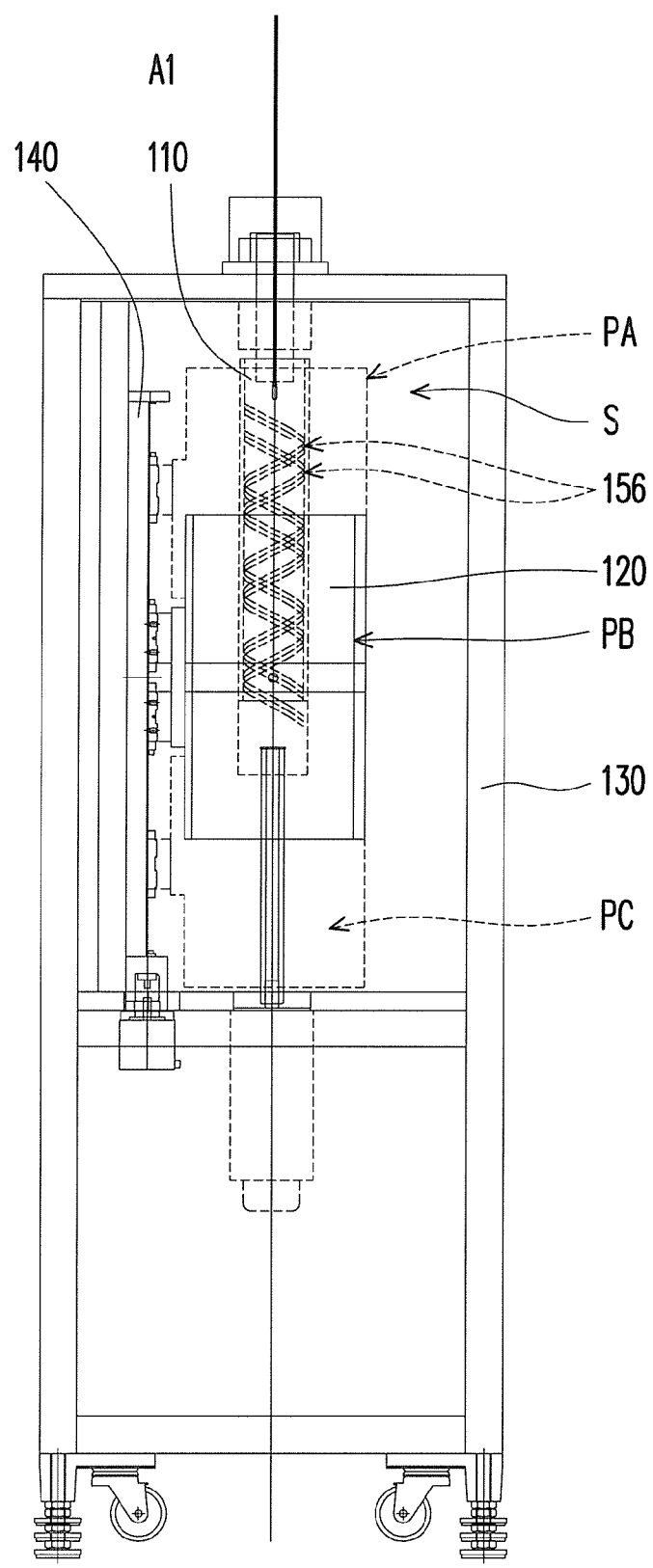
FIG. 2 further illustrates a partial enlargement perspective view of the nanocomposite material apparatus in FIG. 1.

FIG. 2 further illustrates a partial enlargement perspective view of the nanocomposite material apparatus in FIG. 1. Referring to FIG. 2, the acceleration inner tube 110 is disposed along a rotation axis A1. The collection outer tube 120 is circularly disposed on the acceleration inner tube 110 and connecting to a linear sliding guide 140, for example. The linear sliding guide 140 is disposed in parallel to the rotation axis A1. A movement of the collection outer tube 120 connected to the linear sliding guide 140 includes rotating, moving up and down, or moving according to a particular function. In practice, the collection outer tube 120 moves along the linear sliding guide 140 through an external stepping motor, so that the collection outer tube 120 moves oppositely to the acceleration inner tube 110 along the rotation axis A1 through the linear sliding guide 140. A moving track of the collection outer tube 120 in the nanocomposite material apparatus 100 is illustrated by an instant position PA, an instant position PB, and an instant position PC as shown in FIG. 2.

Figure 3:
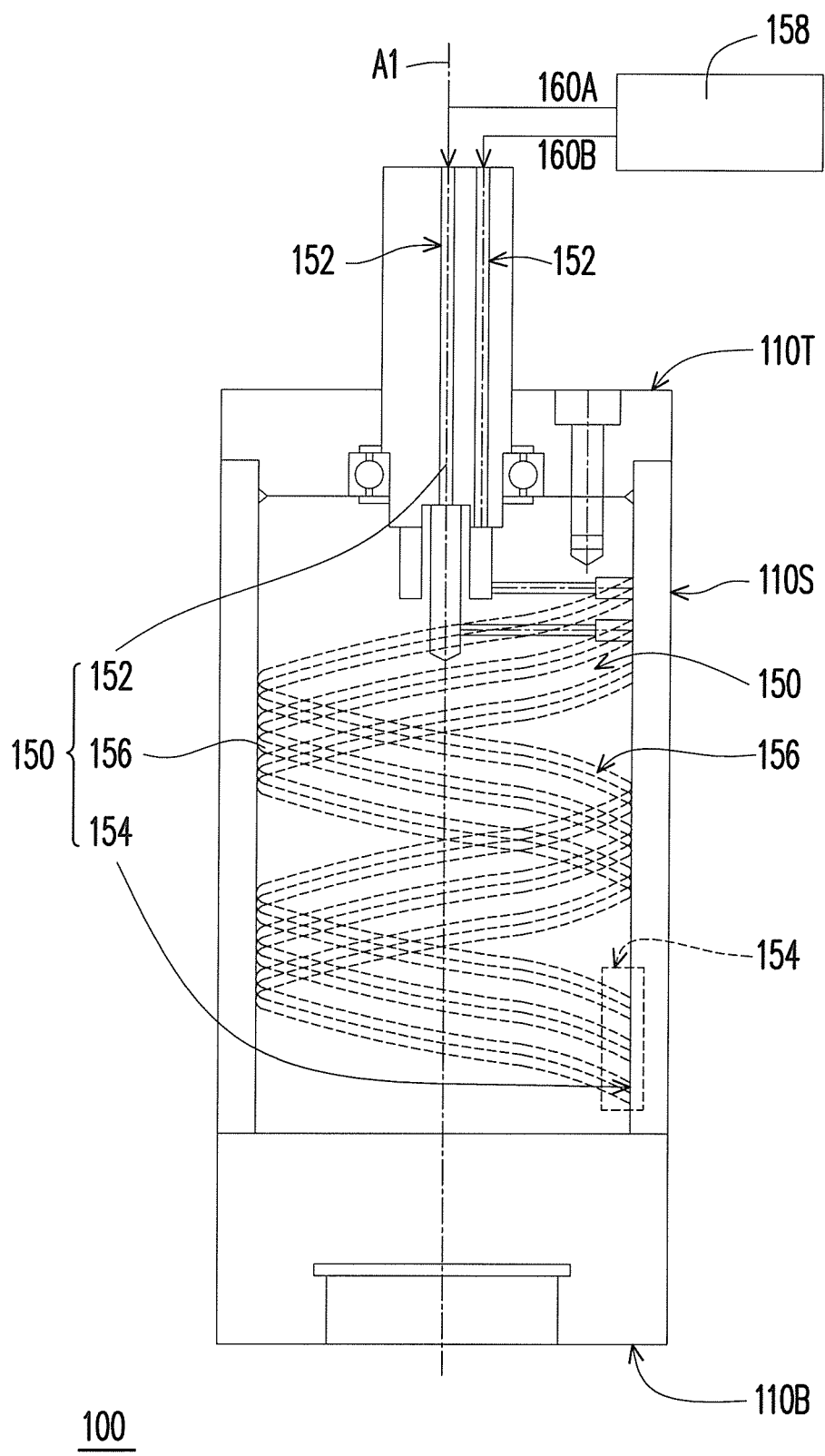
FIG. 3 shows a perspective view of an acceleration inner tube according to the first embodiment of the invention.

More specifically, FIG. 3 shows a perspective view of the acceleration inner tube according to the first embodiment of the invention. Referring to FIG. 3, an exterior of the acceleration inner tube 110, for example, is a cylindrical shape. The acceleration inner tube 110 has a top surface 110T, a bottom surface 110B, and an outer peripheral surface 110S connecting the top surface 110T and the bottom surface 110B. Here, the outer peripheral surface 110S faces an inner wall of the collection outer tube 120 (illustrated in FIG. 2). As shown in FIG. 3, a plurality of pipes 150 for accelerating different materials is distributed within the acceleration inner tube 110. Each pipe 150 includes an inlet 152 connecting to the top surface 110T, an outlet 154 disposed on the outer peripheral surface 110S, and a spiral trench 156 connecting the inlet 152 and the outlet 154. The spiral trench 156 extends, for example, from the top surface 110T to the bottom surface 110B along a spiral curve. Moreover, in the present embodiment, the spiral trenches 156 distributed in the acceleration inner tube 110 are not at the same plane, and the cross-sectional areas of one of the spiral trenches 156 in different planes of the acceleration inner tube 110 are equal. However, in other embodiments, the cross-sectional area of the spiral trench 156 can also increase as a distance away from the top surface 110T increases, for example. Nevertheless, the invention is not limited thereto. Referring to FIG. 2 and FIG. 3 simultaneously, in a practical operation, the acceleration inner tube 110 rotates in a high-speed by adopting the rotation axis A1 as a center. When different materials flow into different spiral trenches 156 respectively from the inlets 152, the materials obtain sufficient energy through a centrifugation force generated from the high-speed rotation of the acceleration inner tube 110 during the flowing process within the spiral trenches 156. Thereafter, the materials are emitted from the outlets 154 disposed on the outer peripheral surface 110S to the inner wall of the collection outer tube 120 in high-speed.

Referring to FIG. 3, the nanocomposite material apparatus 100 is also optionally disposed with a voltage generator 158 connecting to the acceleration inner tube 110, so that different materials are charged through the voltage generator 158 for the nano materials to carry charges after being emitted from the outlets 154. In details, in the present embodiment, the materials are transmitted to the inlets 152 of the acceleration inner tube 110 in a fluid form. For example, the materials are disposed within a piston pump and the piston pump is connected to the voltage generator 158 for conducting electrostatic charges so that the materials are charged and emitted from the outlets 154.

Figure 4:
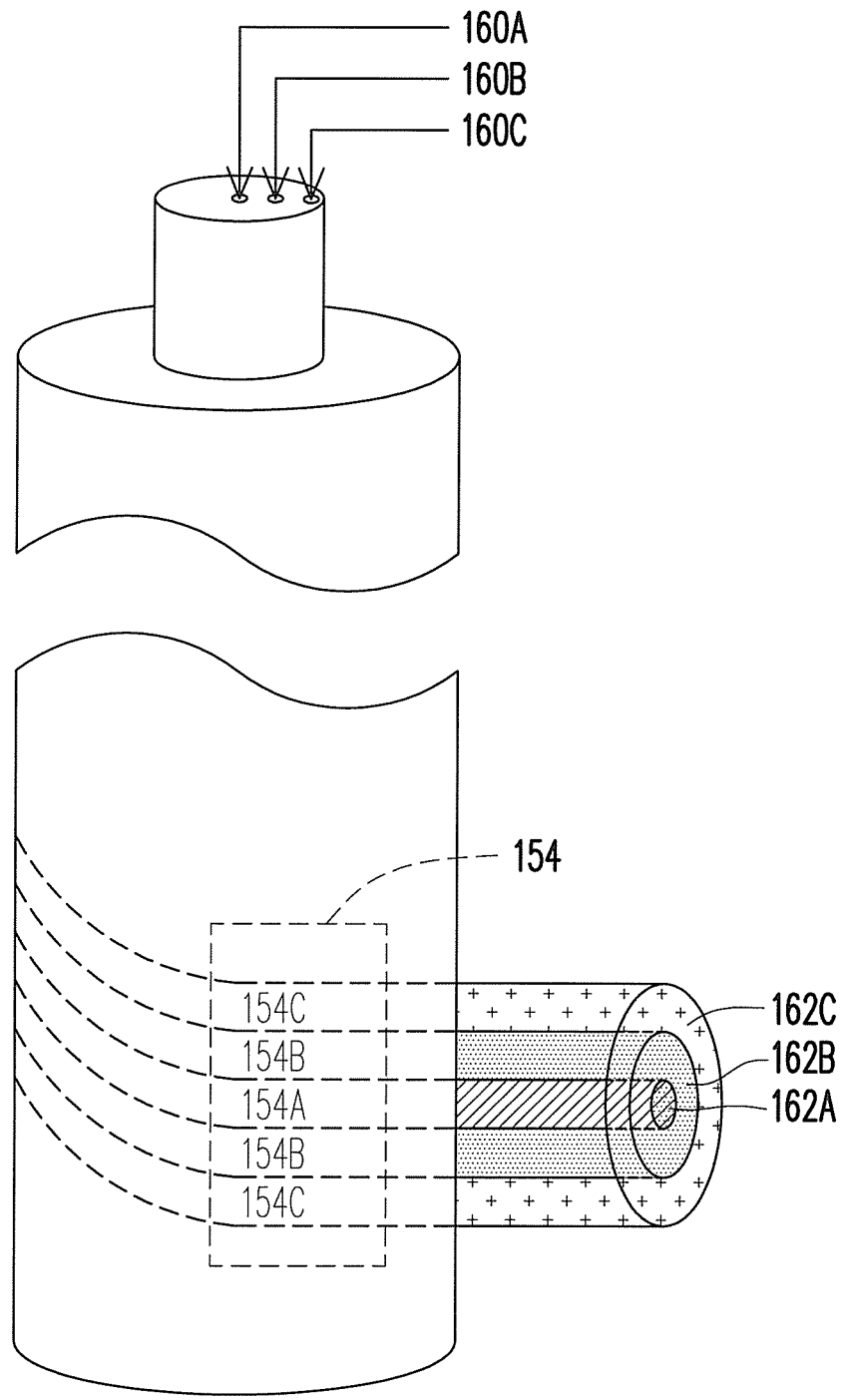
FIG. 4 illustrates an outlet design of the nanocomposite material apparatus according to the first embodiment of the invention.

It should be noted that a length, a curvature, or a diameter of the spiral trench 156 is suitably designed according to properties such as viscosity, feeding speed, and the like of each material or reacting properties between different materials. Therefore, after different materials are accelerated within the corresponding spiral trenches 156, the nano material and the nanocomposite material composed by different materials are emitted from the corresponding outlets 154. Moreover, the composition form between each material in the nano material and the nanocomposite material can be changed by the relative relationship between different outlets 154. For example, FIG. 4 illustrates an outlet design of the nano material and the nanocomposite material according to the first embodiment of the invention. Here, to facilitate the illustration, some possible elements are omitted. As shown in FIG. 4, the outlet 154 includes a first outlet 154A, a second outlet 154B, and a third outlet 154C. Herein, a first nano material 162A made from a first material 160A is emitted via the first outlet 154A, a second nano material 162B made from a second material 160B is emitted via the second outlet 154B, and a third nano material 162C made from a third material 160C is emitted via the third outlet 154C. Since the first outlet 154A, the second outlet 154B, and the third outlet 154C align with one another, the first outlet 154A, the second outlet 154B, and the third outlet 154C are aligned as concentric circles. Thus, after the first nano material 162A, the second nano material 162B, and the third nano material 162C are emitted from the outlet 154, a nanofiber composite material arranged in concentric circles is composed. In other embodiments, the first nano material 162A, the second nano material 162B, and the third nano material 162C are also arranged in a plurality of concentric circles after being emitted from the outlet 154; however, the invention is not limited thereto.

Obviously, in some special nano materials and nanocomposite materials, the designer can first mix a plurality of materials in a section of the outlet 154 or emit the materials from the outer peripheral surface 110S of the acceleration inner tube 110 after the reaction according to properties of the materials. In other words, the nanocomposite material apparatus 100 is capable of adjusting an internal structure of the acceleration inner tube 110 suitably depending on an application field thereof, and is not limited to the scope disclosed in the present embodiment.

Figure 5A:
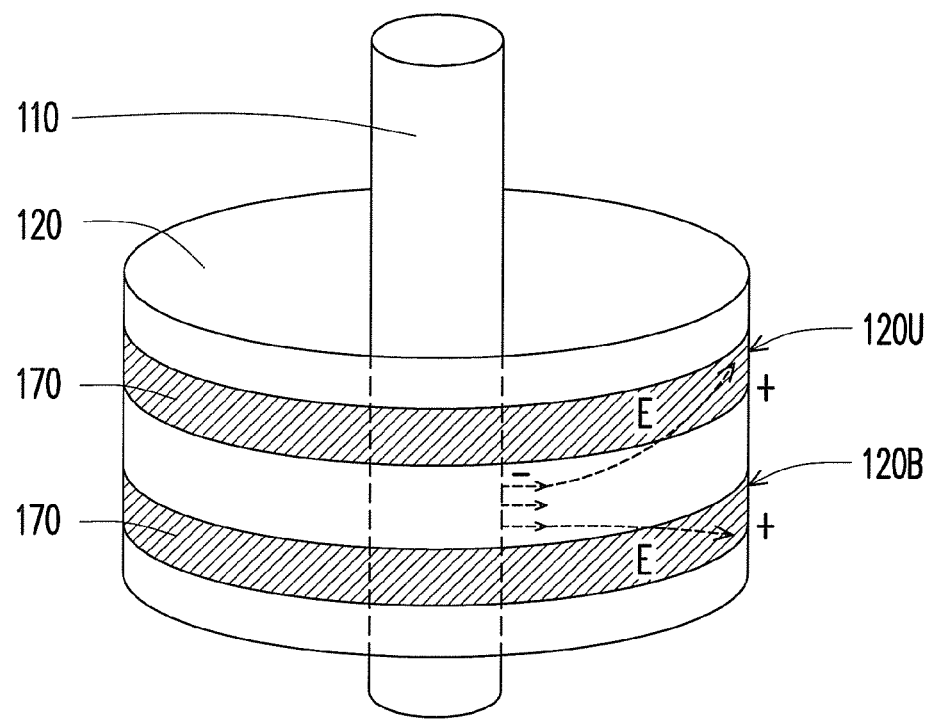
FIG. 5A and FIG. 5B respectively illustrate schematic partial enlargement views of the nanocomposite material apparatus according to the first embodiment of the invention.

In consideration of further enhancing a structural strength of the nanocomposite material, electrode sheets 170 are disposed on the outer wall of the collection outer tube 120 as shown in FIG. 5A. FIG. 5A illustrates a schematic partial enlargement view of a nanocomposite material apparatus according to the first embodiment of the invention. To facilitate illustration, the collection outer tube 120 is represented in a perspective manner and markings of other possible elements are omitted. Referring to FIG. 5A, the electrode sheets 170, for example, are circularly disposed on an upper edge 120U and a lower edge 120B of the outer wall of the collection outer tube 120. In the present embodiment, the nano materials emitted from the outlets 154 are charged. At this time, a reverse charge is applied to the electrode sheets 170, so that a strong electrostatic field E is generated between the acceleration inner tube 110 and the collection outer tube 120. Hence, the charged nano materials emitted from the outlets 154 are affected by the strong electrostatic field E to further accelerate and change an emitting direction. Consequently, the nanocomposite material formed on the inner wall of the collection outer tube 120 is widely distributed and closely interlaced so as to strengthen the strength of the nanocomposite material. Moreover, some solutions remained in the nano materials are also evaporated in this space. In a practical application, when a polymer fluid is used as a nano material, a suitable carrier gas is optionally passed into the space for carrying solutions or reducing temperature of the space to further enhance an efficiency of condensing polymer materials into threads. On the other hand, a reactive gas is passed for the nano material and the nanocomposite material to react so as to obtain a functionalized nano material and nanocomposite material.

Figure 5B:
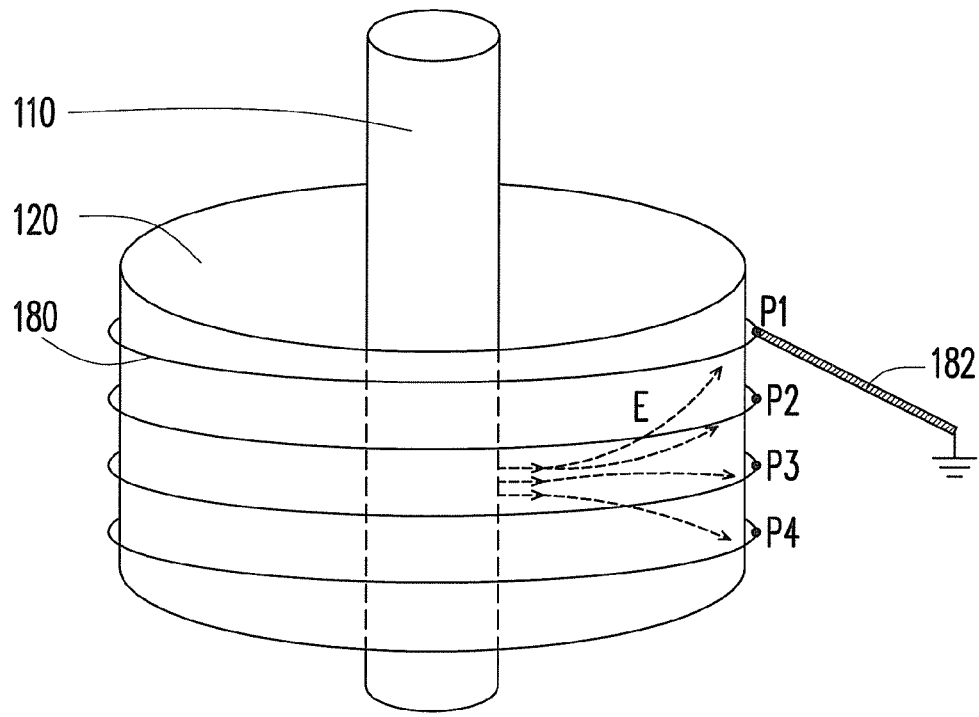

Other than the method aforementioned, FIG. 5B illustrates a schematic partial enlargement view of a nanocomposite material apparatus according to the first embodiment of the invention. In this nanocomposite material apparatus, the structure formed by the charged nano materials within the space of the collection outer tube 120 is also adjusted by changing the electrostatic field. Referring to FIG. 5B, for better illustration, the collection outer tube 120 is represented in a perspective manner and markings of other possible elements are omitted. As shown in FIG. 5B, the nanocomposite material apparatus further includes a spiral coil 180 surrounds the outer wall of the collection outer tube 120 and a grounding rod 182. Here, different sections of the spiral coil 180 include a joint respectively, such as a joint P1, a joint P2, a joint P3, and a joint P4 in the figure. Particularly, the grounding rod 182 is connected to different joints P1, P2, P3, and P4 movably. Dispositions of the joint P1, the joint P2, the joint P3, and the joint P4 are disposed in a direction parallel to the rotation axis, for instance.

As illustrated in FIG. 5B, in the present embodiment, the nano materials emitted from the outlets 154 carry negative charges, for example. At this time, a negative charge is applied to the spiral coil 180, so that a strong electrostatic field E is generated between the acceleration inner tube 110 and the collection outer tube 120. Here, by contacting the grounding rod 182 with different joints, a greatest value in the electrostatic field E is generated between the joint and the nano materials of the acceleration inner tube 110. Hence, the nano materials emitted from the outlets 154 are emitted toward a direction of the joint contacted with the grounding rod 182. In a practical application, the nano materials emitted from the outlets 154 can adjust deposition locations thereof on the collection outer tube 120 rapidly by changing a connecting position P of the grounding rod 182 and the joint of the spiral coil 180 rapidly. In other words, a plurality of nano materials is formed on the collection outer tube 120 in a manner as a circumference through the high-speed rotation of the acceleration inner tube 110. Also, a plurality of nano materials is formed on the collection outer tube 120 along an axial direction by adjusting the electrostatic field. Therefore, a two or higher dimensional nanocomposite material having nanocomposite materials interlacing one another and a high structural strength is formed on the collection outer tube 120.

Figure 6A:
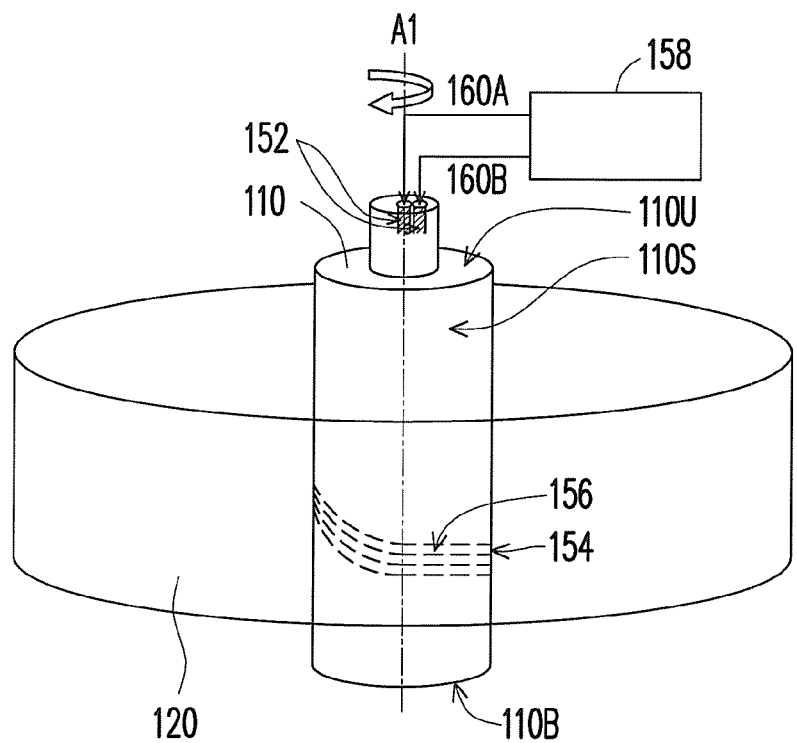
FIG. 6A~6C sequentially illustrate a schematic flowchart of fabricating the nanocomposite material according to the first embodiment of the invention.
Figure 6B:
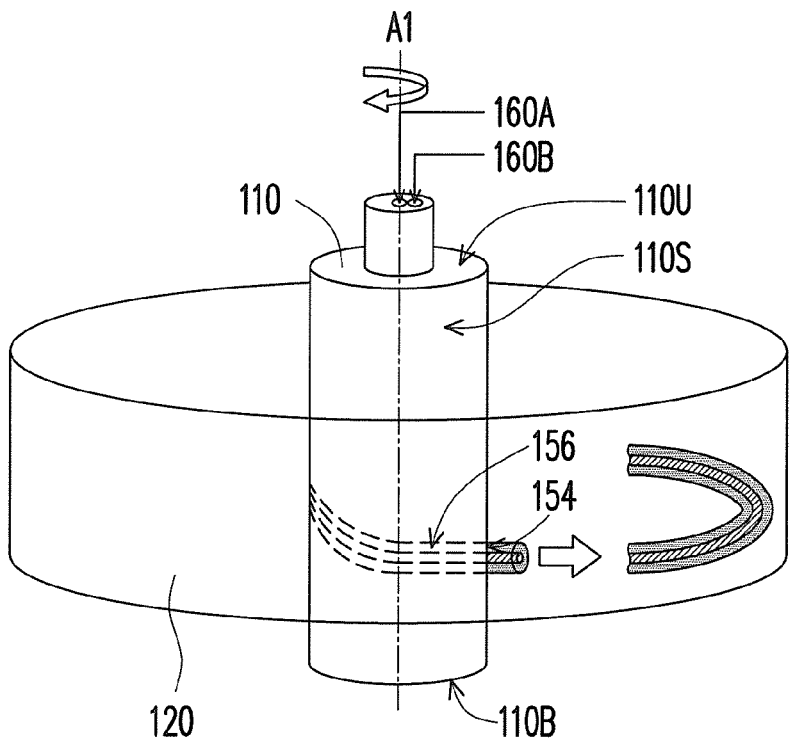
Figure 6C:
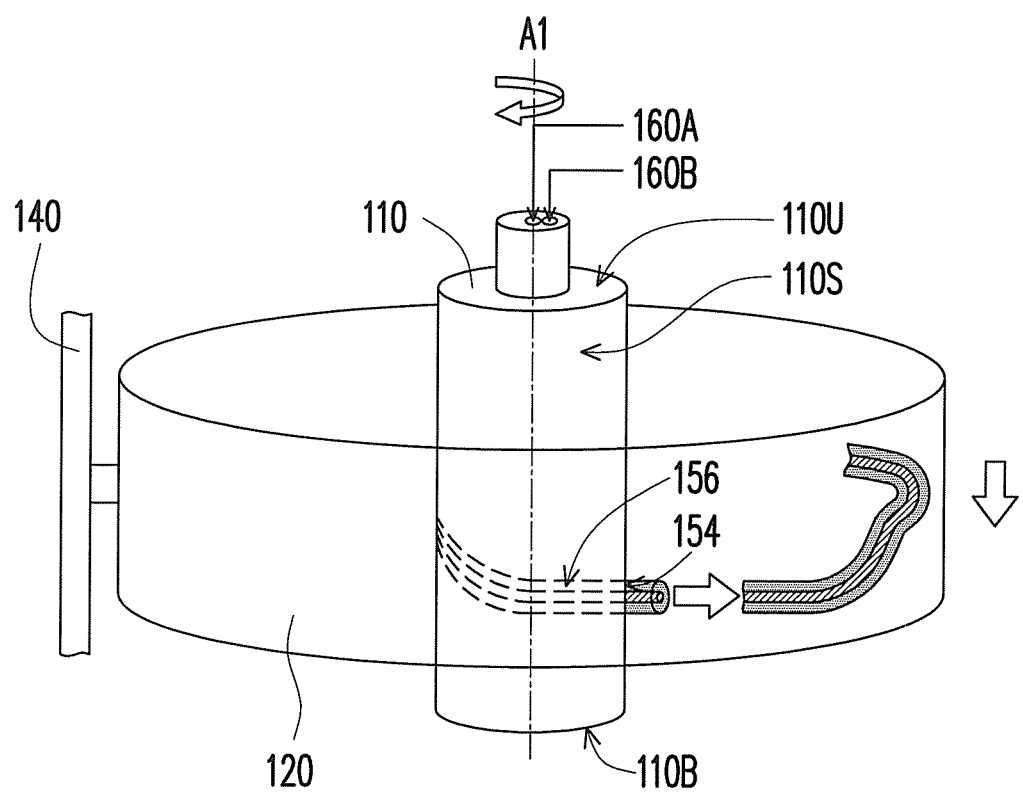

To better explain the technical content of the present invention, the following description in association with the accompanied FIGS. 6A-6C further illustrates a fabricating method of a nanocomposite material of the present embodiment. Furthermore, the nanocomposite material is fabricated by using the nanocomposite material apparatus 100, for example.

FIG. 6A~6C sequentially illustrate a schematic flowchart of fabricating the nanocomposite material according to the first embodiment of the invention. As shown in FIG. 6A, a first material 160A and a second material 160B are respectively provided in different inlets 152. As aforementioned, in this step, the voltage generator 158 is applied to conduct electrostatic charges into the first material 160A and the second material 160B for charging the first material 160A and the second material 160B. Thereafter, as illustrated in FIG. 6B, the first material 160A and the second material 160B are accelerated respectively in the corresponding spiral trenches 156 by a centrifugation force generated by rotating the acceleration inner tube 110, thereby emitting a plurality of charged nano materials from the outlets 154.

Afterwards, as illustrated in FIG. 6C, the nano materials move oppositely to the collection outer tube 120 in a direction parallel to the rotation axis A1. For example, the collection outer tube 120 in the figure moves downwardly and oppositely to the acceleration inner tube 110 through a sliding track 140 which is parallel to the rotation axis A1. Obviously, the relative movement between the nano materials and the collection outer tube 120 is also received by changing the electrostatic field or by combining a mechanical manner of the linear sliding guide 140 and the electric field manner of changing the electrostatic field. However, the invention is not limited thereto. Accordingly, the charged nano materials emitted from the outlets 154 combine with one another and form a nanocomposite material on the inner wall of the collection outer tube 120.

It should be noted that in the method of fabricating the nanocomposite material as shown in FIG. 6A~FIG. 6C, when the first material 160A and the second material 160B in the inlets 152 are provided by continuous feeding, for example, the nano materials emitted from the outlets 154 form a nanofiber so as to form a non-woven nanofiber composite material on the inner wall of the collection outer tube 120. Here, different materials in the nanofiber are arranged in concentric circles, for instance. Clearly, a center of a cross-sectional area of each material in the nanofiber can also be shifted and the invention does not limit the composition form of the nano materials. At this time, materials of the first material 160A and the second material 160B are selected from organic materials or inorganic materials according to different industry fields. Here, the suitable organic materials include polyethylene (PE), polypropylene (PP), nylon, polyester (PET), polyacrylonitrile (PAN), polycarbonate (PC), polystyrene (PS), rayon, and the like. The suitable inorganic materials include metals, metal oxides, ceramic oxides, and carbonates such as glass fiber, silicon dioxide (SiO2), titanium dioxide ($TiO_2$), gold, silver, carbon-nanotubes, carbon-nanoballs, and the like. Moreover, organic metal salts are also suitable to be adopted and include $Me(R)_4$ (Me is Ti, Si, and so on, R is $OC_xH_{2x+1}$, Cl, Br, and so on).

In particular, the electric field effect in cooperation with large centrifugation force may cause certain materials to affect crystallization under the drawing of this acting force. The materials include polycarbonate (PC), polylactic acid (PLA), polyacrylonitrile (PAN), Polyether Ether Ketone (PEEK) and the like of the organic materials, for example.

Moreover, the nanocomposite material can also be formed by purposely adopting a second material 160B having a low melting point or glass transition temperature and a first material 160A having a high melting point or glass transition temperature. After the nanocomposite material is formed, a heating process with a temperature higher than the melting point of the second material 160B is further performed. The second material 160B transforms into an adhesive between the first material 160A after the heating process so as to enhance the structural strength of the nanocomposite material made from the first material 160A and the second material 160B. As aforementioned, when the second material 160B and the first material 160A are switched and processed with high temperature, a nanofiber with a hollow structure is obtained.

Figure 7:
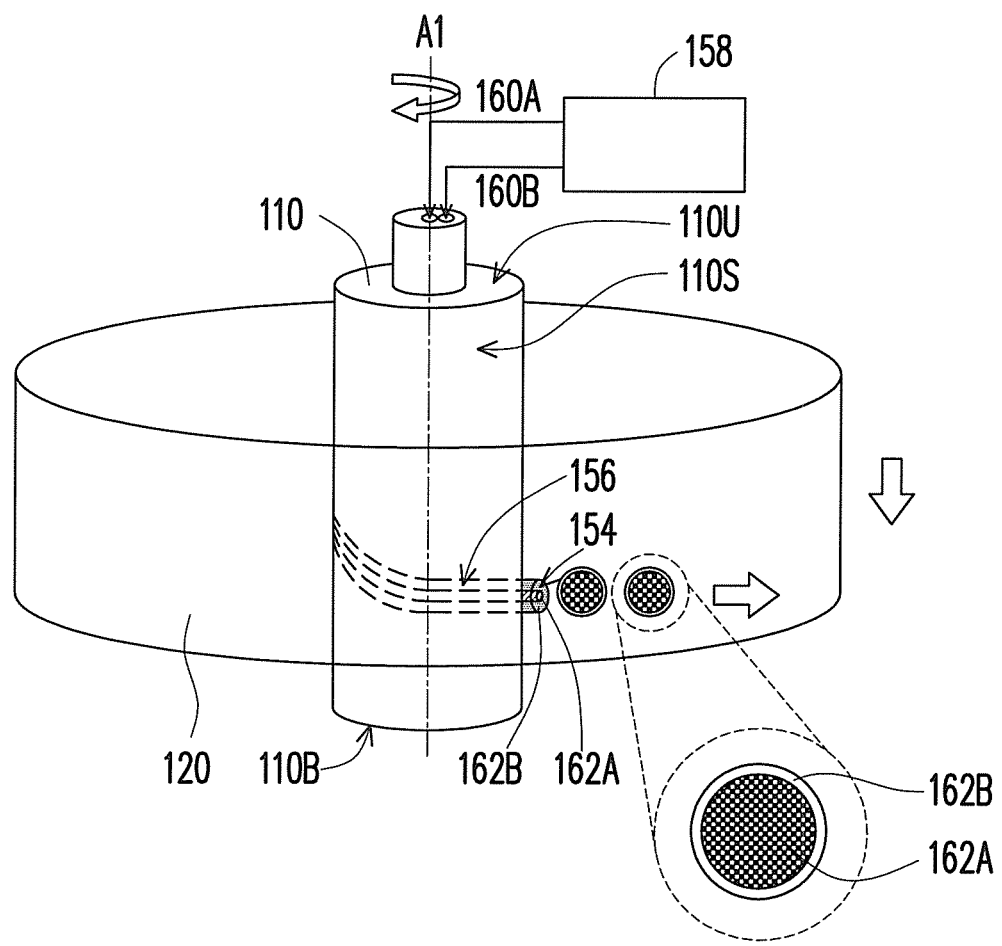
FIG. 7 illustrates the nanocomposite material according to the first embodiment of the invention.

In addition, when the second material 160B uses three major base materials of carbon fibers, such as polyacrylonitrile (PAN), pitch, or rayon to encapsulate the inorganic material of the first material 160A, a nanocomposite carbon fiber having high strength, high crystallization, and multi-functionality can be obtained after carbonization. In application fields of some displays, the nanocomposite material formed by the nanocomposite material apparatus of the invention is also utilized as a display particle suitable for an electronic paper display. In details, in the method of fabricating the nanocomposite material in FIG. 6A~FIG. 6C, the first material 160A and the second material 160B in the inlets 152 are provided by sectioned feeding as shown in FIG. 7. FIG. 7 illustrates the nanocomposite material according to the first embodiment of the invention. Referring to FIG. 7, the second nano material 162B emitted form the outlet 154 encapsulates the first nano material 162A completely to jointly form a nanoball composite material having a particle form. At this time, the first material 160A is a display medium having carbon-black, for example, and the second material 160B is a polymer capping layer encapsulating the first material 160A, for example.

Obviously, the nanocomposite material formed by the nanocomposite material apparatus in the invention is also applied in biomedical field according to demands. In this application, as shown in FIG. 7, a material having biocompatibility or certain special properties is selected as the second material 160B and a material having magnetic property, electro-optical property, or medicine is selected as the first material 160A. The second nano material 162B having biocompatibility or certain special properties encapsulates the first nano material 162A having magnetic property, electro-optical property, or medicine in the outlet, the nanocomposite material formed is then applied in drug releasing agents, cell tissue targets, or electro-optical materials.

Second Embodiment

The second embodiment of the invention is mainly directed to a new, simple, and easily maintained nanomaterial apparatus for forming a nano material directly. On one hand, the centrifugation force of the acceleration inner tube is utilized for the nano material to receive a certain degree of drawing so as to obtain a nano material with high distribution and superior structural strength. On the other hand, the trenches configured for accelerating the materials are disposed on the same plane within the acceleration inner tube body for exposing the trenches. Moreover, a detachable acceleration inner tube lid is installed on the exposed trenches. Hence, the nano material apparatus of the second embodiment of the invention further considers the maintenance of the machine, so that the nano material apparatus can be detached, maintained, and assembled easily after a period of operation, thereby maintaining a product yield rate of the nano materials.

Figure 8A:
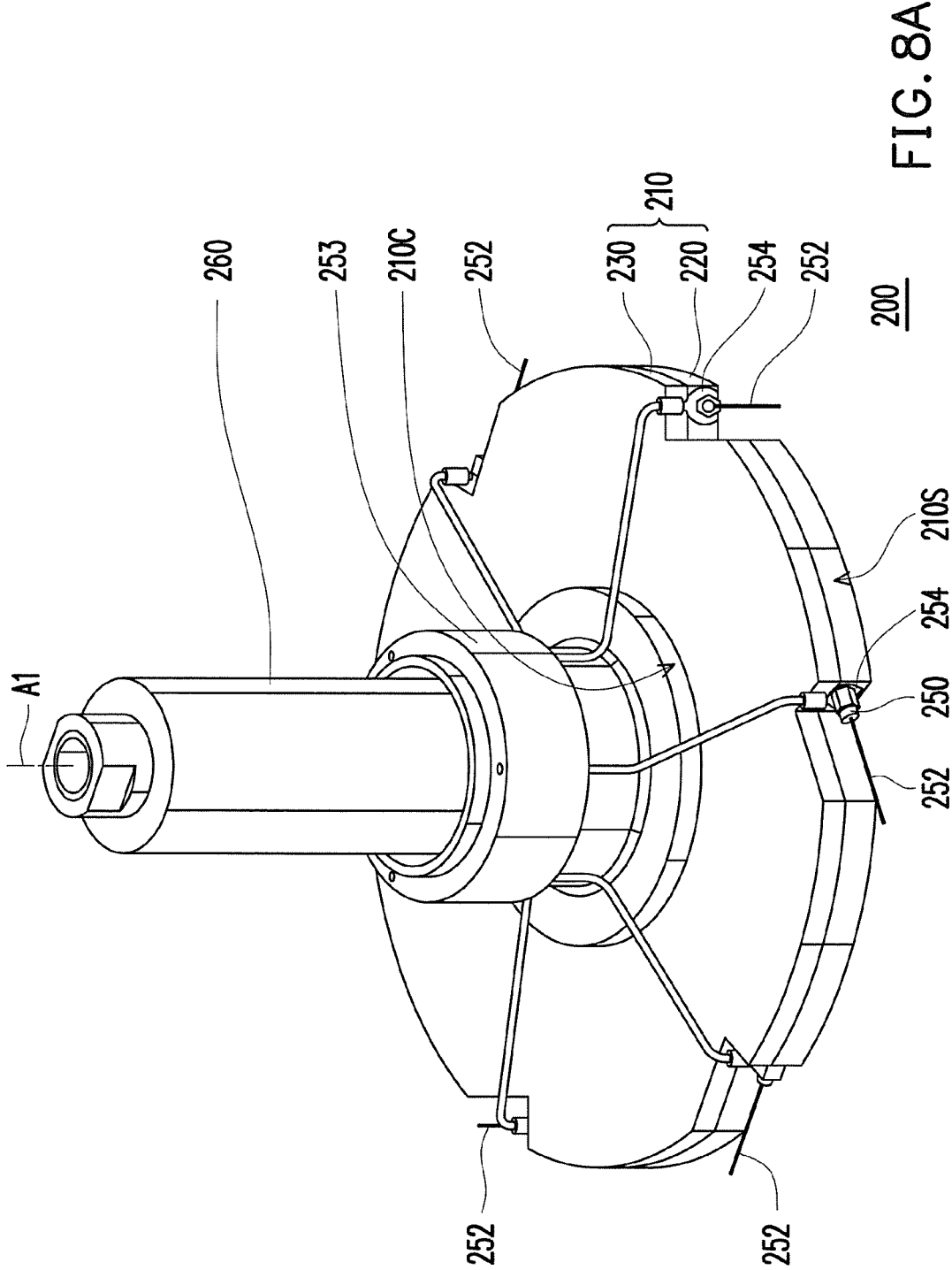
FIG. 8A and FIG. 8B show a schematic partial exterior view and a partial perspective view of a nano material apparatus according to a second embodiment of the invention.
Figure 8B:
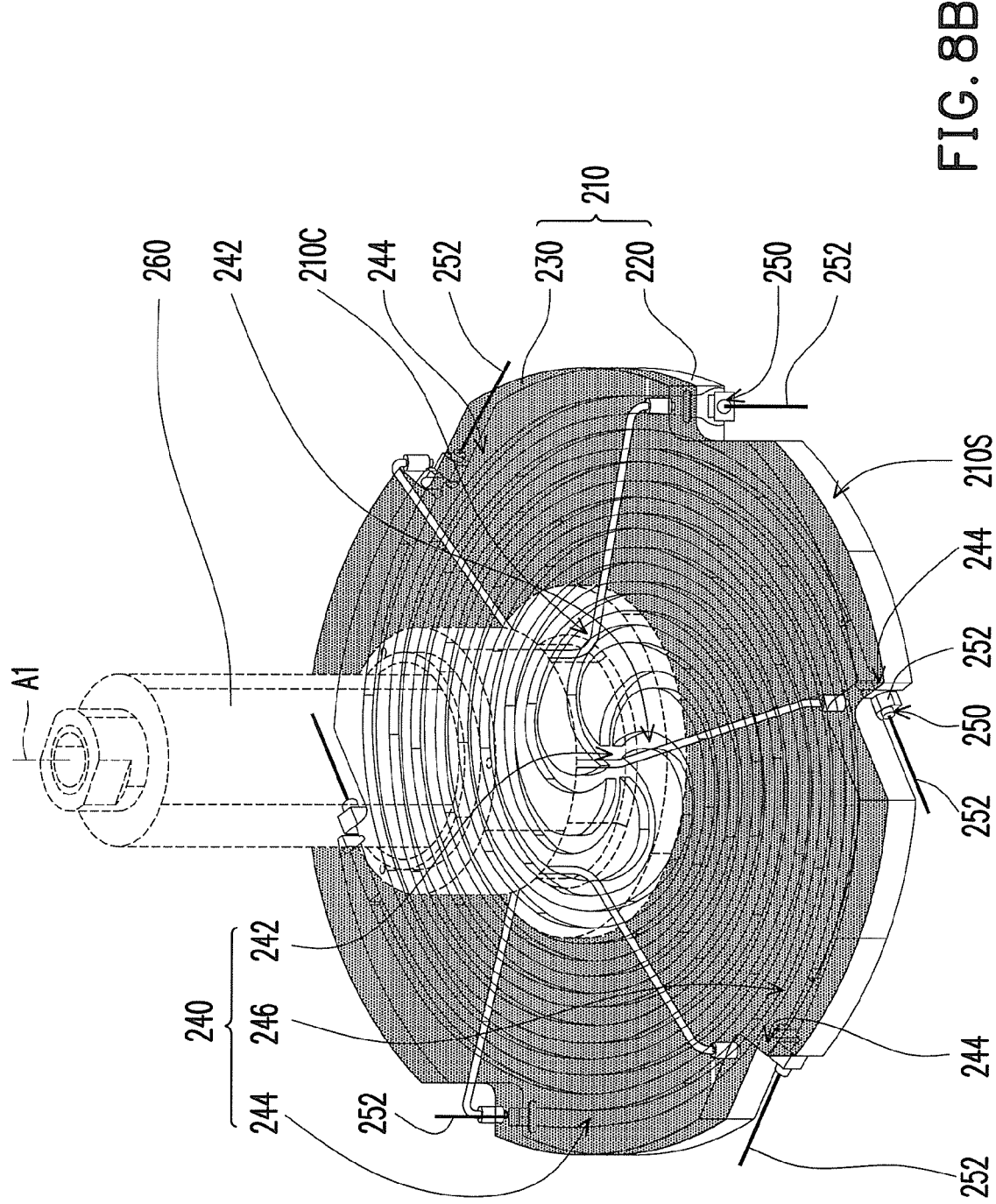

FIG. 8A and FIG. 8B respectively show a schematic partial exterior view and a partial perspective view of the nano material apparatus of the second embodiment of the invention. In order to facilitate illustration, a shape of the trench located on the acceleration inner tube body in the perspective view of FIG. 8B is illustrated in solid lines and elements disposed thereupon are illustrated in dotted lines. Additionally, for better illustration, only the elements different from those illustrated in the first embodiment are illustrated in FIG. 8A and FIG. 8B, such as a design of the acceleration inner tube, and other possible elements, such as the collection outer tube, the outer container, and the like are omitted. Further, a nano material apparatus 200 of the present embodiment merely illustrates a design of an acceleration inner tube 210, which can be used to fabricate the nano materials independently. Clearly, the nano material apparatus 200 of the present embodiment can also replace the acceleration inner tube 110 illustrated in FIG. 2 with the acceleration inner tube 210 illustrated in FIG. 8A and FIG. 8B to constitute the nano material apparatus 200 of another form. Details are illustrated in the following.

Referring to FIG. 8A and FIG. 8B, the nano material apparatus 200 of the present embodiment is suitable for fabricating a material into a nano material. Further, an exterior of the acceleration inner tube 210 within the nano material apparatus 200 is like a round disk, for example. In the present embodiment, the nano material apparatus 200 is mainly constituted by the an acceleration inner tube body 220 and an acceleration inner tube lid 230. Here, the acceleration inner tube body 220 is disposed along a rotation axis A1. The acceleration inner tube 210 has a core portion 210C and an outer peripheral surface 210S. Here, the outer peripheral surface 210S faces the inner wall of the collection outer tube 120 (illustrated in FIG. 2). As shown in FIG. 8A and FIG. 8B, a plurality of pipes 240 for accelerating materials is distributed within the acceleration inner tube body 220. Herein, the pipes 240 include an inlet 242 located on the core portion 210C, a plurality of outlets 244 disposed on the outer peripheral surface 210S, and a plurality of trenches 246 connecting the inlet 242 and the outlets 244. Particularly, the trenches 246 are located on a same plane of the acceleration inner tube body 220 and exposed. A material for forming the nano materials is a nano material accelerated through the pipes 240 and emitted from pin nozzles 252 of the outlets 244. Notably, the acceleration inner tube lid 230 covers the trenches 246 exposed and is installed detachably on the acceleration inner tube body 220. Accordingly, after the acceleration inner tube lid 230 is easily detached, the nano material apparatus 200 is capable of maintaining the trenches 246 within the acceleration inner body 220 to maintain the nano material apparatus 200 and enhance production efficiency and quality.

Referring to FIG. 8A and FIG. 8B, in order to further enhance the structural strength of the nanocomposite material, in the present embodiment, the nano material apparatus 200 is further disposed with a charged conductive nozzle 250 at each outlet 244, so that the nano materials are charged through the charged conductive nozzles 250 when emitted from the outlets 244. In the present embodiment, each conductive nozzle 250 has a pin 252, and the nano materials are emitted from the pin 252 of the conductive nozzle 250 and then charged. Specifically, as shown in FIG. 8A and FIG. 8B, the nano material apparatus 200 further includes a rotation axle 260 fixing the acceleration inner tube body 220, a conductive ring 253, and a plurality of conductive sheets 254. Here, a center line of the rotation axle 260 aligns with the rotation axis A1. In other words, in a practical operation, the rotation axle 260 drives the acceleration inner tube 210 for the acceleration inner tube 210 to rotate along the center line of the rotation axle 260. In addition, the conductive ring 253 is circularly disposed on the rotation axle 260 and each conductive sheet 254 is disposed between each outlet 244 and the corresponding nozzle. Practically, the conductive ring 253 is, for example, connected with an external voltage generator 158 (illustrated in FIG. 3) and configured to transmit charges to the conductive nozzles 250 through the conductive sheets 254 and emit from pins 252 thereof for charging the emitted nano materials.

The nano material apparatus 200 of the present embodiment can also refer to the nano composite material apparatus in the first embodiment for optionally disposing a collection outer tube circularly on the outer peripheral surface 210S of the acceleration inner tube 210 (illustrated in FIG. 2). Moreover, contents disclosed in the first embodiment are referred to when considering the form and the design of the collection outer tube. Referring to FIG. 2, FIG. 8A, and FIG. 8B, in short, the collection outer tube 120 is applied with a reverse charge opposite to the charged nano materials so as to generate a strong electrostatic field E between the acceleration inner tube 210 and the collection outer tube 120. Consequently, the nano material formed on the inner wall of the collection outer tube 120 is more widely distributed and more closely interlaced, thereby strengthening the nano material. Furthermore, the nano material apparatus 100 in the first embodiment is referred to for optionally installing the sliding track 140 to generate a relative movement between the collection outer tube 120 and the acceleration inner tube 210 and further strengthen the interlacing strength of the nano materials. Besides, the inner wall of the collection outer tube 120 has a predetermined pattern, so that the nano material formed on the collection outer tube has a pattern identical to the predetermined pattern. For example, the predetermined pattern is a mesh pattern, a circular pattern, or a polygonal pattern.

Figure 9A:
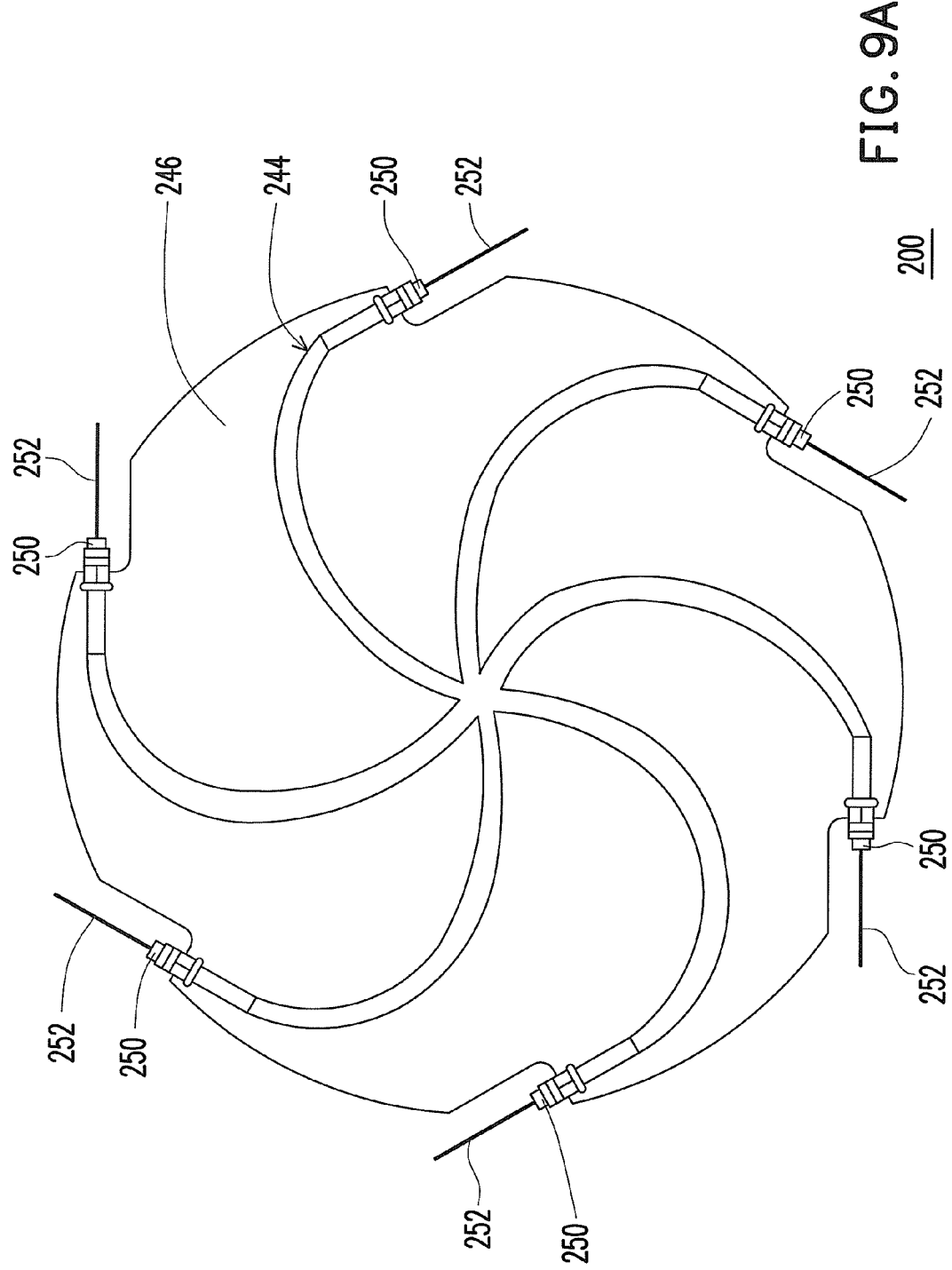
FIG. 9A and FIG. 9B respectively illustrate top views of an acceleration inner tube body according to the second embodiment of the invention.
Figure 9B:
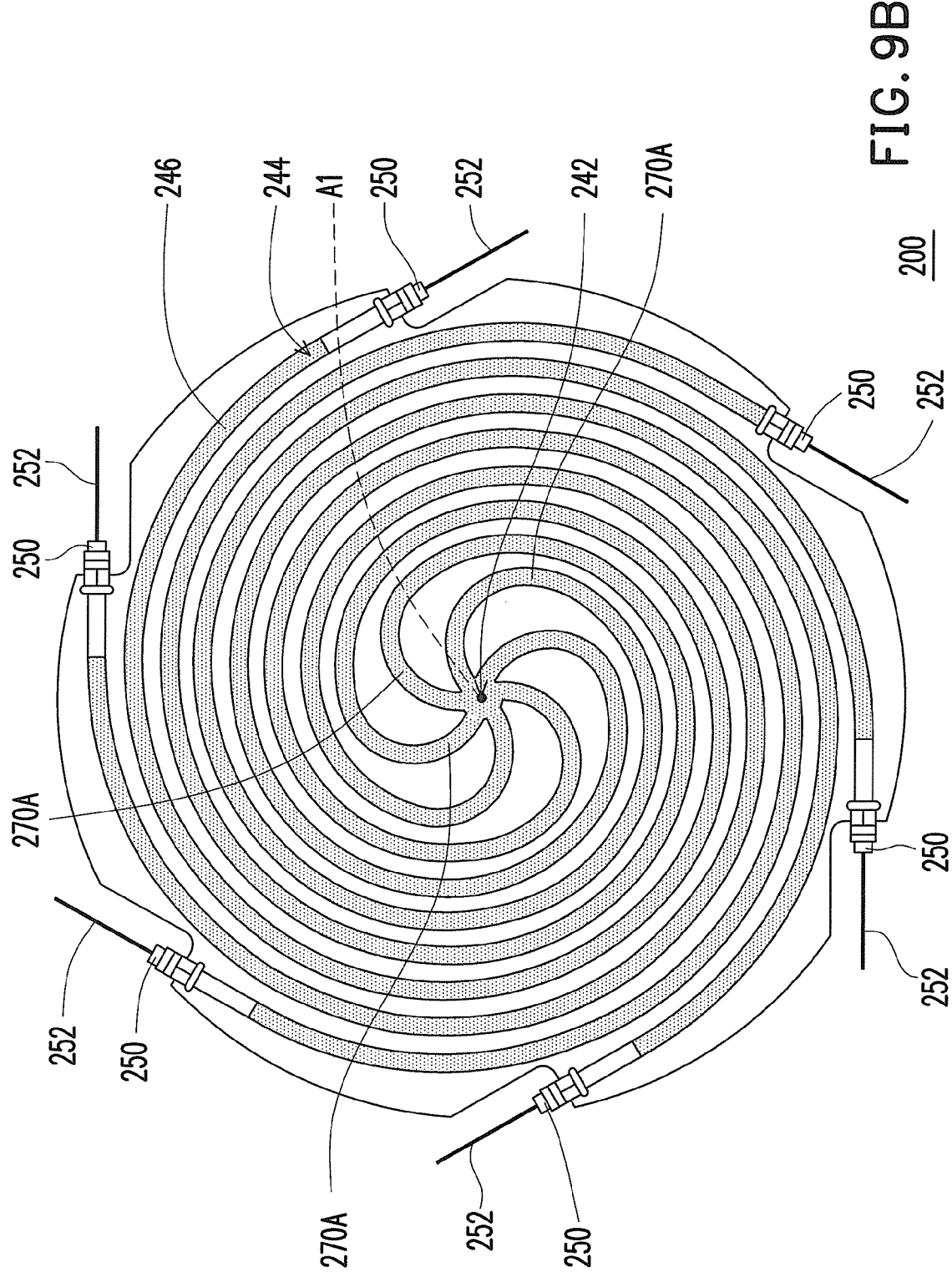

FIG. 9A and FIG. 9B respectively illustrate top views of the acceleration inner tube body according to the second embodiment of the invention. Referring to FIG. 9A, the trenches 246 are substantially located on a top surface of the acceleration inner tube body 220 and radiate from the core portion 210C to the outer peripheral surface 210S in a radiation form, for example. Referring to FIG. 9B, each trench 246 extends along the same plane of the acceleration inner tube body from the core portion 210C to the outer peripheral surface 210S along a spiral curve, for instance. In other words, to each trench 246, a curvature radius of the spiral curve increases with an increase of a moving track of the material in the trench 246.

As shown in FIG. 9B, the pipes 240 for accelerating materials 270A are distributed in the acceleration inner tube 210. In a practical operation, the acceleration inner tube 210 rotates with high speed by adopting the rotation axis A1 as the center. When the materials 270A flow into different trenches 246 from the inlet 242, the materials 270A obtain sufficient energy through the centrifugation force generated by the high-speed rotation during the flowing process within the trenches 246. Thereafter, the materials 270A are emitted in high speed from the outlets 244 disposed on the outer peripheral surface 210S. It should be noted that a length, a curvature, or a diameter of the spiral trench 156 is suitably adjusted according to properties such as viscosity, feeding speed, a size of the acceleration inner tube 210, a number of the trenches, and the like of each material. Alternatively, when the material is composed of a plurality of materials 270A having reacting properties, a designer designs a form of the trenches 246 according to reacting properties between different materials. Thus, after being accelerated through the trenches 246, the materials 270A emit different material compositions and nano materials of different composition forms from the corresponding outlets 244.

In micro point of view, when a particle in the material 270A flow into the acceleration inner tube body 220 from the inlet 242, since an initial speed of the particle within the acceleration inner tube body 220 is smaller, a curvature radius of the particle on an upper stream side of the trench 246 adjacent to the inlet 242 is smaller. With an increase in the flowing track of the particle in the trench 246, the particle gradually obtains sufficient energy from the acceleration inner tube 210 rotating in high-speed to accelerate the flowing speed of the mass. Therefore, the particle has a greater curvature radius on a lower stream side of the trench 246 adjacent to the outlet 244. Therefore, the shape of the trenches 246 in the nano material apparatus 200 of the invention is designed according to a particle moving track on a plane in a rotating object.

Figure 10:
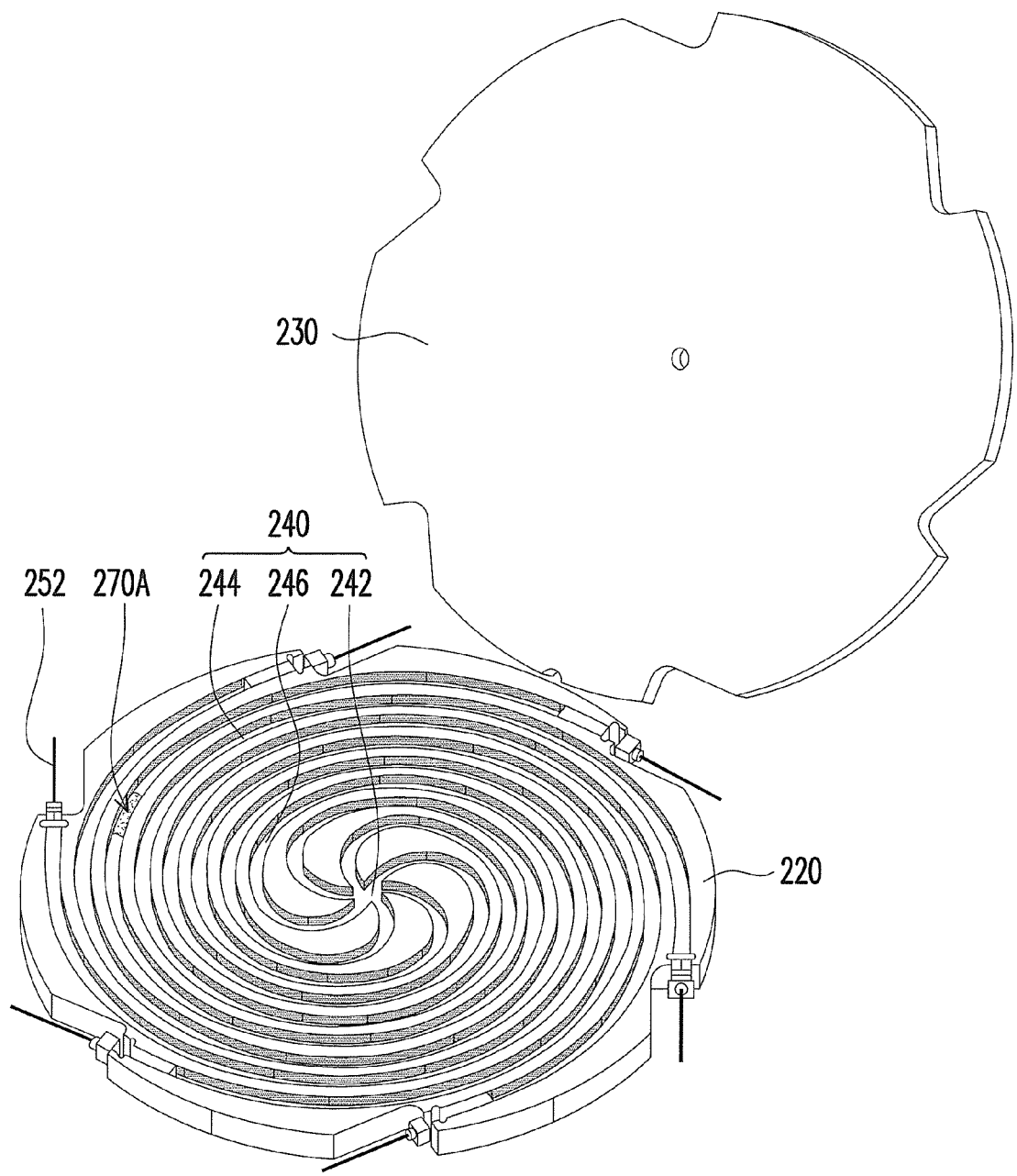
FIG. 10 illustrates a schematic exploded view of an acceleration inner tube in the nano material apparatus according to the second embodiment of the invention.

FIG. 10 illustrates a schematic exploded view of an acceleration inner tube in the nano material apparatus according to the second embodiment of the invention. Referring to FIG. 10, the acceleration inner tube lid 230 covers a side of the trenches 246 having a flat surface, for instance. In other embodiments, a side of the acceleration inner tube lid 230 covering the trenches 246 is also disposed with grooves corresponding to each trench 246 to increase flowing diameters of the materials in the trenches 246. However, a design of the acceleration inner tube lid 230 is not limited in the present invention. Notably, in application of nano materials formed by adopting the materials 270A having reacting properties, the trenches 246 are not only configured to provide a physical acceleration effect, but also provides a method for the material 270A to carry out a chemical reaction. Therefore, a product from the chemical reaction is accelerated directly in the trenches 246 and emitted from the outlets 244 to form the nano material. In short, the nano material apparatus 200 of the invention processes the materials 270A having reactivity, so that the reactive materials are not only accelerated but also reacted in the trenches 246 at the same time and a functionalized nano material is obtained from the outlets 244.

However, in an application field of processing reactive materials, since chemical reactions produce some byproducts unavoidably or have byproducts, reactants from incomplete reactions, or unflowing products remaining on the inner wall of the trenches 246 due to restraints in thermodynamics or dynamics, the trenches 246 of the acceleration inner tube body 220 are blocked, thereby affecting the flowing of subsequent materials and production of nano materials. Therefore, the trenches 246 of the nano material apparatus 200 in the present embodiment are disposed on the top surface of the same plane along the acceleration inner tube body 220. When the acceleration inner tube lid 230 and the acceleration inner tube body 220 separated from each other the plurality of trenches 246 are exposed to the external environment. Therefore, when performing maintenance, a user easily detaches the acceleration inner tube lid 230 from the acceleration inner tube body 220 in an easy step. Next, a washing step is performed to wash the trenches 246 in the acceleration inner tube body 220 and the flat surface of the acceleration inner tube lid 230.

Notably, in the present embodiment, the materials 270A provided in the inlet 242 are a single material or a plurality of materials. The form of the nano materials emitted from the outlets 244 includes a nano material composed by a single material, a nanocomposite material composed by a plurality of materials, or a functionalized nano material. However, the composition form of the nano materials emitted from the outlets 244 is not limited in the invention. For example, the materials 270A provided in the inlet 242 include a material disclosed in the first embodiment or selected from one of the groups including organic metal precursor salts, high polymer materials, or mixtures of organic materials and inorganic materials. Moreover, the nano materials emitted from the outlets 244 include metals, metal oxides, ceramic materials, polymer compounds, or mixtures of organic/inorganic materials, for example. The form of the nano materials includes nanofiber, nanoball composite material, and the like. However, the invention is not limited thereto.

Hence, the nanocomposite material apparatus, the nano material apparatus, and the method of fabricating the nanocomposite material in the first embodiment and the nano material apparatus and the nano material in the second embodiment have a portion or all of at least the advantages described below:

1. The nanocomposite material apparatus utilizes the centrifugation force of the acceleration inner tube to reduce different materials into the nanometer level nano material. Moreover, by suitably disposing the spiral trenches in the acceleration inner tube, different nano materials are evenly distributed after being emitted from the acceleration inner tube.

2. By incorporating a suitable structure to the collection outer tube of the nanocomposite material apparatus or the nano material apparatus, the formation of the collection outer tube not only can be performed with the radial movement, but can also be facilitated by the axial movement when the nano materials combine with one another to form a nanocomposite material on the collection outer tube.

3. In the composition of the nanocomposite material, different nano materials interlace one another in a high degree and have superior properties. In some embodiments, by controlling the speed of feeding, the nanocomposite ball with a particle shape is optionally formed to be applied in displays, biomedical materials, or touch media application.

4. In the nano material apparatus, the trenches are disposed on the same plane of the acceleration inner tube body and exposed. Therefore, when performing periodic maintenance or repairing of the nano material apparatus, the user can easily maintain the nano material apparatus with a simple step, thereby maintaining the yield rate of the nano material and enhancing the quality of the nano material product.

What is claimed is:

1. A nanocomposite material apparatus, suitable for fabricating a nanocomposite material from different materials, the nanocomposite material apparatus comprising: an acceleration inner tube, disposed along a rotation axis, having a top surface, a bottom surface, and an outer peripheral surface connecting the top surface and the bottom surface, and distributed with a plurality of pipes for accelerating different materials, wherein each pipe comprises an inlet connecting to the top surface, an outlet disposed on the outer peripheral surface and a spiral trench connecting the inlet and the outlet, and a plurality of charged nano materials is emitted from the corresponding outlets by accelerating different materials within the corresponding pipes; and a collection outer tube, disposed circularly on the outer peripheral surface of the acceleration inner tube and suitable for moving oppositely to the acceleration inner tube along the rotation axis, so that the nano materials emitted from the outer peripheral surface are combined with one another and form the nanocomposite material on an inner wall of the collection outer tube.

2. The nanocomposite material apparatus as claimed in claim 1, wherein the plurality of spiral trenches extends from the top surface to the bottom surface along a spiral curve.

3. The nanocomposite material apparatus as claimed in claim 1, further comprising a linear sliding guide connecting to the collection outer tube, wherein the linear sliding guide is disposed in parallel to the rotation axis and the collection outer tube moves back and forth oppositely to the acceleration inner tube by the linear sliding guide.

4. The nanocomposite material apparatus as claimed in claim 1, further comprising two electrode sheets, circularly disposed on an upper edge and a lower edge of an outer wall of the collection outer tube respectively, and an electrostatic field generated between the acceleration inner tube and the collection outer tube.

5. The nanocomposite material apparatus as claimed in claim 1, further comprising a spiral coil and a grounding rod, the spiral coil covering on the outer wall of the collection outer tube and having a joint respectively on different sections of the spiral coil, and the grounding rod connecting to the plurality of joints movably.

6. The nanocomposite material apparatus as claimed in claim 1, wherein the plurality of outlets comprises a first outlet and a second outlet, a first nano material made from a first material is emitted via the first outlet, a second nano material made from a second material is emitted via the second outlet, the first outlet aligns with the second outlet, and the first outlet and the second outlet are arranged as concentric circles.

7. The nanocomposite material apparatus as claimed in claim 1, further comprising a voltage generator connecting to the acceleration inner tube, and the plurality of materials is charged through the voltage generator.

8. The nanocomposite material apparatus as claimed in claim 1, further comprising an outer container, wherein the outer container has an accommodating space and a movable outer lid, the acceleration inner tube and the collection outer tube are stored within the accommodating space, and the accommodating space forms a closed space by closing the movable lid.

9. A method of fabricating a nanocomposite material, suitable for fabricating through a nanocomposite material apparatus as claimed in claim 1, the method comprising: providing a first material and a second material in different inlets respectively; accelerating the first material and the second material respectively in the plurality of spiral trenches by a centrifugation force generated by rotating the acceleration inner tube to emit the plurality of charged nano materials from the plurality of outlets; and moving the plurality of nano materials oppositely to the collection outer tube in a direction parallel to the rotation axis; and combining the plurality of nano materials with one another and forming the nanocomposite material on the inner wall of the collection outer tube.

10. The method of fabricating the nanocomposite material as claimed in claim 9, wherein the method of charging the plurality of nano materials comprises:
    before providing the first material and the second material in the plurality of inlets, conducting positive charges and negative charges into the first material and the second material through a voltage generator.

11. The method of fabricating the nanocomposite material as claimed in claim 9, wherein a method of moving the plurality of nano materials oppositely to the collection outer tube in a direction parallel to the rotation axis comprises:
    connecting the collection outer tube with a linear sliding guide, wherein the linear sliding guide is parallel to the rotation axis and the collection outer tube moves back and forth oppositely to the acceleration inner tube through the linear sliding guide.

12. The method of fabricating the nanocomposite material as claimed in claim 9, wherein a method of moving the plurality of nano materials oppositely to the collection outer tube in parallel to the rotation axis comprises:
    disposing a charged electrode sheet on an upper edge and on a lower edge of an outer wall of the collection outer tube respectively, and generating an electrostatic field between the acceleration inner tube and the collection outer tube; and
    moving the plurality of nano materials emitted from the plurality of outlets oppositely to the collection outer tube through the electrostatic field.

13. The method of fabricating the nanocomposite material as claimed in claim 9, wherein the method of moving the plurality of nano materials oppositely to the collection outer tube in parallel to the rotation axis comprises:
    covering a charged spiral coil on the outer wall of the collection outer tube, wherein the spiral coil have a joint in different sections parallel to the rotation axis and an electrostatic field is generated between the spiral coil and the acceleration inner tube; and contacting one of the plurality of joints of the spiral coil with a grounding rod so as to generate a greatest value in the electrostatic field at the joint, emitting the plurality of nano materials emitted from the plurality of outlets toward a direction of the joint contacted with the grounding rod.

14. The method of fabricating the nanocomposite material as claimed in claim 9, wherein the first material and the second material in the plurality of inlets are provided by continuous feeding, and the plurality of nano materials emitted from the plurality of outlets forms nanofibers so as to form a non-woven nanofiber composite material on the inner wall of the collection outer tube.

15. The method of fabricating the nanocomposite material as claimed in claim 9, wherein a first nano material made from the first material is emitted from the corresponding outlet, a second nano material made from the second material is emitted from the corresponding outlet, and the second nano material wraps the first nano material.

16. The method of fabricating the nanocomposite material as claimed in claim 9, wherein the first material and the second material in the plurality of inlets are provided by sectioned feeding, and the second nano material emitted from the plurality of outlets encapsulates the first nano material completely to form a nanoball composite material in a particle form.

17. The method of fabricating the nanocomposite material as claimed in claim 9, wherein the first material is an organic material or an inorganic material.

18. The method of fabricating the nanocomposite material as claimed in claim 9, wherein the second material is an organic material or an inorganic material.

19. The method of fabricating the nanocomposite material as claimed in claim 9, wherein a melting point or glass transition temperature of the first material is smaller than a melting point or glass transition temperature of the second material, or the melting point or glass transition temperature of the first material is greater than the melting point or glass transition temperature of the second material.

20. The method of fabricating the nanocomposite material as claimed in claim 9, further comprising providing a third material simultaneously when providing the first material and the second material in different inlets, and constituting the nanocomposite material by alternative arrangement when emitting the first material, the second material, and the third material from the corresponding outlets.

21. A nano material apparatus, suitable for fabricating a material into a nano material, the nano material apparatus comprising:
an acceleration inner tube body, disposed along a rotation axis and having a core portion and an outer peripheral surface, and distributed with a plurality of pipes for accelerating the material, wherein the plurality of pipes comprises an inlet located at the core portion, a plurality of outlets disposed on the outer peripheral surface, and a plurality of trenches connecting the inlet and the plurality of outlets, the plurality of trenches is located on a same plane of the acceleration inner tube body and exposed, and each trench extends along the same plane of the acceleration inner tube body from the core portion to the outer peripheral surface along a spiral curve, and a nano material is emitted from the plurality of outlets by accelerating the material via the plurality of pipes; and
an acceleration inner tube lid, covering the plurality of trenches and installed detachably on the acceleration inner tube body.

22. The nano material apparatus as claimed in claim 21, wherein the plurality of trenches is substantially located on a top surface of the acceleration inner tube body and radiates from the core portion toward the outer peripheral surface in a radiation form.

23. The nano material apparatus as claimed in claim 21, wherein the acceleration inner tube lid covers a side of the plurality of trenches having a flat surface.

24. The nano material apparatus as claimed in claim 21, wherein the material is reactive and the material is accelerated and reacted at the same time in the plurality of trenches to obtain a functionalized nano material from the plurality of outlets.

25. The nano material apparatus as claimed in claim 21, further comprising a plurality of conductive nozzles, wherein each conductive nozzle is disposed on each outlet and charged, the nano material being charged is emitted from the plurality of outlets via the plurality of conductive nozzles.

26. The nano material apparatus as claimed in claim 25, further comprising a rotation axle, a conductive ring, and a plurality of conductive sheets, wherein a center line of the rotation axle aligns with a rotation axis, the acceleration inner tube body is fixed to the rotation axle, the conductive ring is circularly disposed on the rotation axle, each conductive sheet is located between each outlet and the corresponding nozzle, and the plurality of conductive sheets transmits charges to the plurality of conductive nozzles through the conductive ring.

27. The nano material apparatus as claimed in claim 21, further comprising a collection outer tube, circularly disposed on the outer peripheral surface of the acceleration inner tube body and suitable for moving oppositely to the acceleration inner tube along the rotation axis, so that the nano materials emitted from the outer peripheral surface are combined with one another and form a nano material on an inner wall of the collection outer tube.

28. The nano material apparatus as claimed in claim 27, wherein the collection outer tube is charged and an electrostatic field is generated between the acceleration inner tube body and the collection outer tube.

29. The nano material apparatus as claimed in claim 27, wherein the inner wall of the collection outer tube has a predetermined pattern, so that the nano material formed on the collection outer tube has a pattern identical to the predetermined pattern.

* * * * *